Patented Apr. 16, 1940

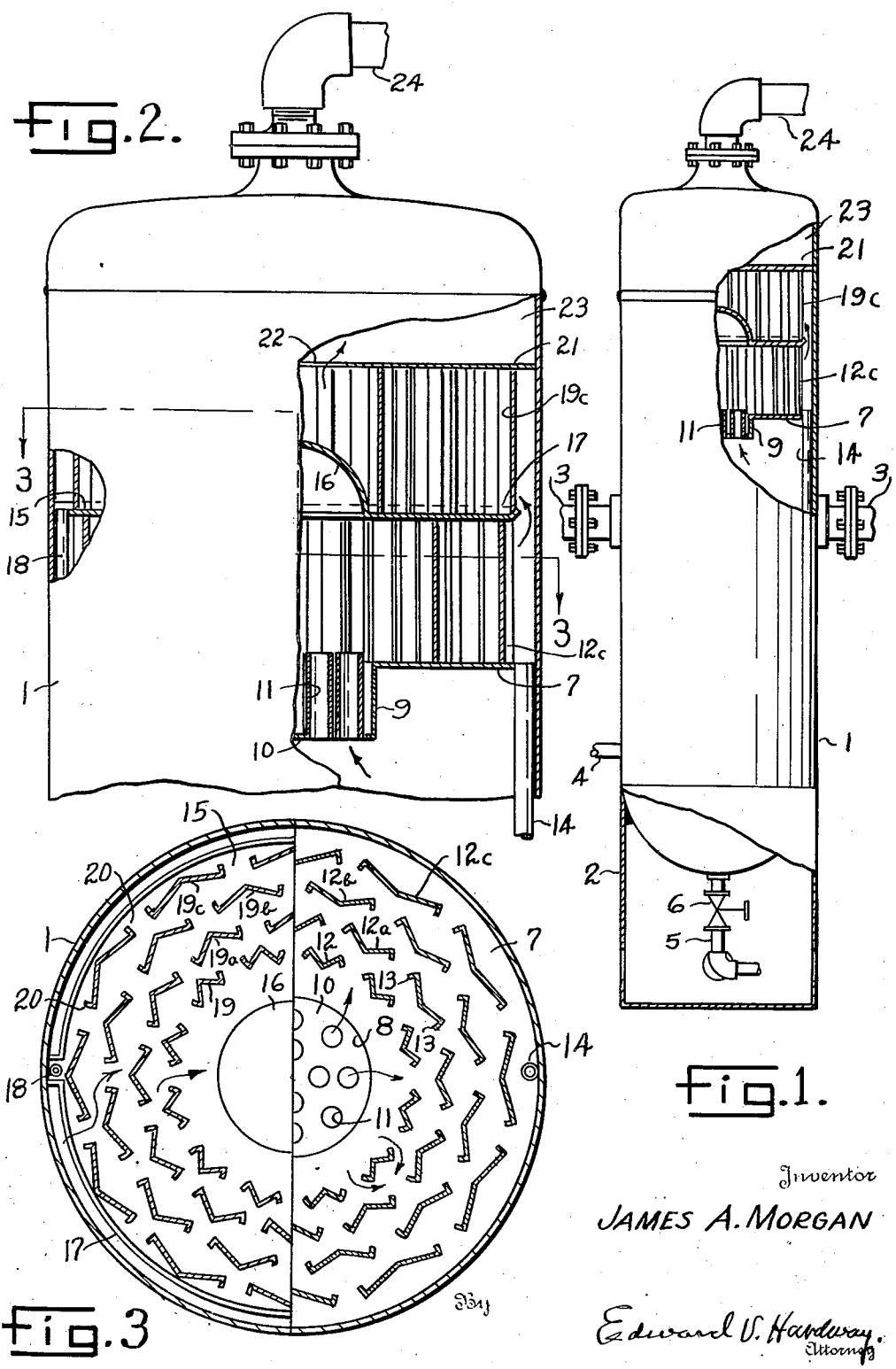

2,197,189

UNITED STATES PATENT OFFICE 2,197,189

SCRUBBER

James A. Morgan, Houston, Tex.

Application October 4, 1938, Serial No. 233,172

2 Claims. (Cl. 183—94)

This invention relates to a scrubber designed for the purpose of separating entrained liquids and solids from a gas or vapor. The scrubber is primarily intended for separating or removing liquid particles of petroleum from the gaseous fluid in which the liquid particles may be suspended.

The present invention is adapted for the purpose of treating natural gas as it comes from the wells so as to remove the oil, gasolene, other petroleum products and solids therefrom. The invention is also adapted for the purpose of removing moisture from steam or air and for other similar purposes.

Another object of the invention is to provide a separator of the character described having a single stage, or a plurality of stages of baffles arranged in series through which the gas or vapor to be cleansed is forced to pass and by means of which the liquid or solid particles may be removed from the gas so that the gas will be efficiently and completely scrubbed or relieved of said liquid or solid particles.

It is a further object of the invention to provide a scrubber of the character described which is of simple construction, which may be cheaply and easily constructed, which will not readily become clogged and which is very efficient for the purposes intended.

With the above and other objects in view, the invention has particular relation to certain novel features of construction, arrangement of parts and use, an example of which is given in this specification and illustrated in the accompanying drawing, wherein—

Figure 1 shows a side view of the scrubber, partly in section.

Figure 2 shows an enlarged fragmentary side view partly in section, and

Figure 3 shows a horizontal cross sectional view taken on the line 3—3 of Figure 2.

Referring now more particularly to the drawing wherein like numerals of reference designate the same parts in each of the figures, the numeral 1 designates an upright shell which may be of any conventional form and which may be supported on any suitable type of base as 2. The shell has one or more inlet lines, as 3, two being shown. It also has an outlet line 4, said inlet and outlet lines being valve controlled in the usual way. The shell is also equipped with a drain outlet line 5 which is normally closed by the valve 6 which may be opened to permit the draining of collected sediment from the shell.

Above the inlet lines 3 there is a transverse partition 7 entirely across the shell. This partition has a central opening which is completely surrounded by the depending cylindrical guard 9 whose lower end is closed by the bottom 10. Upstanding from said bottom 10 are the tubes 11 whose upper ends extend slightly above the level of the partition 7, as shown in Figure 2 and whose lower ends are open to the interior of the shell beneath.

The gas entering through the lines 3, as well as that being given off from the liquid in the shell, will pass upwardly through the tubes 11 in the direction indicated by the arrows in Figures 1 and 2. The velocity of the gas passing through the tubes will necessarily be accelerated and as the gas emerges from the tubes into the compartment above the partition 7, the gas will suddenly expand, being thereby relieved of some of the liquid particles therein.

Upstanding from the partition 7 are the series of baffles 12, 12a, 12b, 12c. These baffles are arranged in circular series, the baffles of one series being arranged staggered with relation to those of adjacent series. These baffles are of an angular shape in horizontal cross section, as shown, their apexes being directed inwardly so as to divide the currents of vapor flowing outwardly in a general radial course through between them. The margins of these baffles have inwardly directed flanges 13, 13, extending from the upper to the lower ends thereof. These flanges will accelerate the deposit or condensation of the liquid particles on the baffles and the condensate will drain down onto the partition 7 and will flow thence down through the return pipe 14 into the body of liquid in the shell beneath.

The upper ends of the baffles 12, 12a, 12b, 12c terminate in an approximately horizontal plane and mounted on them is a hood 15 having a central upwardly curved dome 16, if desired. The margin 17 of the hood 15 is spaced inwardly from the walls of the shell and is upturned as shown in Figure 2 and this hood is provided with a drain pipe 18 leading downwardly therefrom through which the liquid collecting on the hood may drain down onto the partition 7 and may pass thence through the pipe 14 into the body of the liquid in the shell beneath.

Upstanding from the hood 15 are the baffles 19, 19a, 19b, and 19c, arranged in circular series. The baffles of each series are staggered with respect to those of the adjacent series. They are angular in shape in horizontal cross section with their apexes directed outwardly so as to divide the currents of vapor flowing in a general radial course inwardly between them. Their margins terminate in outwardly directed flanges as 20 against which the inflowing currents of vapor engage and which facilitate the condensation of the liquid particles in the vapor, the condensate draining downwardly onto the hood and thence through the pipe 18.

The upper ends of the baffles 19, 19a, 19b, 19c terminate in a horizontal plane and mounted thereon is the transverse partition 21, extending entirely across the shell. The partition 21 has a central opening 22, to permit the upward passage of the vapor into the outlet chamber 23 of the shell.

Leading from this outlet chamber 23 there is an outlet pipe 24 through which the gas may be delivered to the desired destination.

The gas passing upwardly through the tubes 11, as above explained, will pass outwardly in a general radial direction through between the baffles 12, 12a, 12b, 12c and will be partially scrubbed, that is, relieved of the liquid and solid particles therein and will pass thence upwardly, in the direction indicated by the arrow in Figure 1, around the margin of the hood 15 and will pass thence inwardly in radial direction through between the baffles 19, 19a, 19b, 19c and will be, by said last-mentioned baffles, relieved of the further liquid particles therein and will pass up through the opening 22 into the chamber 23 and thence out through the outlet pipe 24, in a cleansed and dry state.

It is to be understood that while I have described and illustrated one preferred form of the invention, that the invention is not limited to the exact construction disclosed but includes whatever changes may be made with the scope of the appended claims; and in this connection it may be stated that in some cases a single stage of baffles may be sufficient and in other cases a plurality of stages may be employed depending on the condition of the gas or other vapors to be scrubbed.

What I claim is:

1. A separator comprising a shell having an inlet line, a lower transverse partition extending across the shell above said inlet line, said partition having a central opening, a cylindrical guard surrounding said opening and depending from the partition whose lower end is closed, tubes anchored to said lower end and extending upwardly through the guard and whose upper ends terminate above the level of the lower partition, an upper, transverse partition extending across the shell above said lower partition having a central opening, a plurality of stages of vertical, plate-like baffles between the partitions, the baffles of each stage being arranged in series and the baffles of each series being staggered with relation to the baffles of the adjacent series, a hood separating the stages of baffles and whose margin is spaced inwardly from the walls of the shell and upturned, a drain pipe leading downwardly from the hood and a drain pipe leading downwardly from the lower partition, said drain pipes terminating in the shell beneath the lower partition, the baffles of each stage being angular in cross-section with their apexes directed forwardly toward the vapors passing upwardly through the corresponding stages of baffles, each baffle having marginal, forwardly directed flanges extending from the upper to the lower end thereof.

2. A separator comprising a shell having an inlet line, a lower transverse partition extending across the shell above said inlet line, said partition having an opening, a guard surrounding said opening and depending from the partition and whose lower end is closed, tubes anchored to said lower end and extending upwardly through the guard and whose upper ends terminate above the level of the power partition, an upper, transverse partition extending across the shell above said lower partition having an opening, a plurality of stages of vertical, plate-like baffles between the partitions, the baffles of each stage being arranged in series and the baffles of each series being staggered with relation to the baffles of the adjacent series, a hood separating the stages of baffles and whose margin is spaced inwardly from the walls of the shell, a drain pipe leading downwardly from the hood and a drain pipe leading downwardly from the lower partition, said drain pipes terminating in the shell beneath the lower partition, the baffles of each stage being angular in cross-section with their apexes directed forwardly toward the vapors passing upwardly through the corresponding stages of baffles, each baffle having marginal, forwardly directed flanges extending approximately from the upper to the lower end thereof.

JAMES A. MORGAN.